United States Patent
Sultan et al.

(10) Patent No.: US 9,438,618 B1
(45) Date of Patent: Sep. 6, 2016

(54) THREAT DETECTION AND MITIGATION THROUGH RUN-TIME INTROSPECTION AND INSTRUMENTATION

(71) Applicant: Amazon Technologies, Inc., Seattle, WA (US)

(72) Inventors: Hassan Sultan, Seattle, WA (US); John Schweitzer, Virginia Beach, VA (US); Donald Lee Bailey, Jr., Penn Laird, VA (US); Gregory Branchek Roth, Seattle, WA (US); Nachiketh Rao Potlapally, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/673,642

(22) Filed: Mar. 30, 2015

(51) Int. Cl.
*G06F 7/04* (2006.01)
*H04L 29/06* (2006.01)

(52) U.S. Cl.
CPC ........... *H04L 63/1433* (2013.01); *H04L 63/20* (2013.01)

(58) Field of Classification Search
USPC .................................. 726/26, 1, 22; 713/189
See application file for complete search history.

(56) References Cited

U.S. PATENT DOCUMENTS

| | | | | |
|---|---|---|---|---|
| 6,952,779 B1* | 10/2005 | Cohen | ................. | H04L 63/1433 726/22 |
| 7,624,448 B2* | 11/2009 | Coffman | ............... | G06F 21/552 726/22 |
| 8,209,738 B2* | 6/2012 | Nicol | .................... | H04L 41/142 709/224 |
| 8,341,745 B1* | 12/2012 | Chau | ....................... | G06F 21/56 709/223 |
| 8,407,798 B1* | 3/2013 | Lotem | ..................... | G06F 21/55 726/18 |
| 8,662,145 B2* | 3/2014 | Gatenby | ............ | B22D 11/0605 164/432 |
| 8,813,236 B1* | 8/2014 | Saha | ................... | H04L 63/1408 726/22 |
| 8,996,622 B2* | 3/2015 | Donato | ............. | G06F 17/30861 709/204 |
| 9,203,805 B2* | 12/2015 | Goyal | ................. | H04L 63/0254 |
| 2013/0133064 A1* | 5/2013 | Goyal | ................. | H04L 63/0254 726/22 |
| 2015/0047026 A1* | 2/2015 | Neil | .................... | H04L 63/1425 726/22 |

\* cited by examiner

*Primary Examiner* — Amare F Tabor
(74) *Attorney, Agent, or Firm* — Davis Wright Tremaine LLP

(57) ABSTRACT

A system and method for threat detection and mitigation through run-time introspection. The system and method comprising receiving a request to monitor a computing environment. Based on the received request, the system and method further includes determining a set of introspection points for monitoring the computing environment. receive a request to monitor a computing environment, measuring at individual introspection points of the set of introspection points to obtain a set of measurements, generating a graph of a set of resources in the computing environment, wherein the graph correlates individual resources in the set of resources to other resources based on at based at least in part on the set of measurements, and determining whether to perform a security action based at least in part on whether an evaluation of the graph indicates a threat to the computing environment.

23 Claims, 9 Drawing Sheets

THREAT DETECTION AND MITIGATION THROUGH RUN-TIME INTROSPECTION AND INSTRUMENTATION

BACKGROUND

A distributed computing system includes a variety of resource types, such as software applications, data storage resources, and network resources. The interactions and relationships of these various resources with each other, and with resources external to the distributed computing system, can be difficult to track, which makes security vulnerabilities of the distributed computing system difficult to identify. Moreover, maintaining the security of the distributed computing system becomes increasingly challenging as applications are updated over time and as the complexity and usage of the system increases. Furthermore, it can also be difficult to isolate and troubleshoot issues with the system, and even when issues are identified, reliably securing the system may be challenging. Additionally, such distributed computing systems may not be configured to allow automated mitigation of such vulnerabilities.

BRIEF DESCRIPTION OF THE DRAWINGS

Various embodiments in accordance with the present disclosure will be described with reference to the drawings, in which.

DETAILED DESCRIPTION

Figure 1:
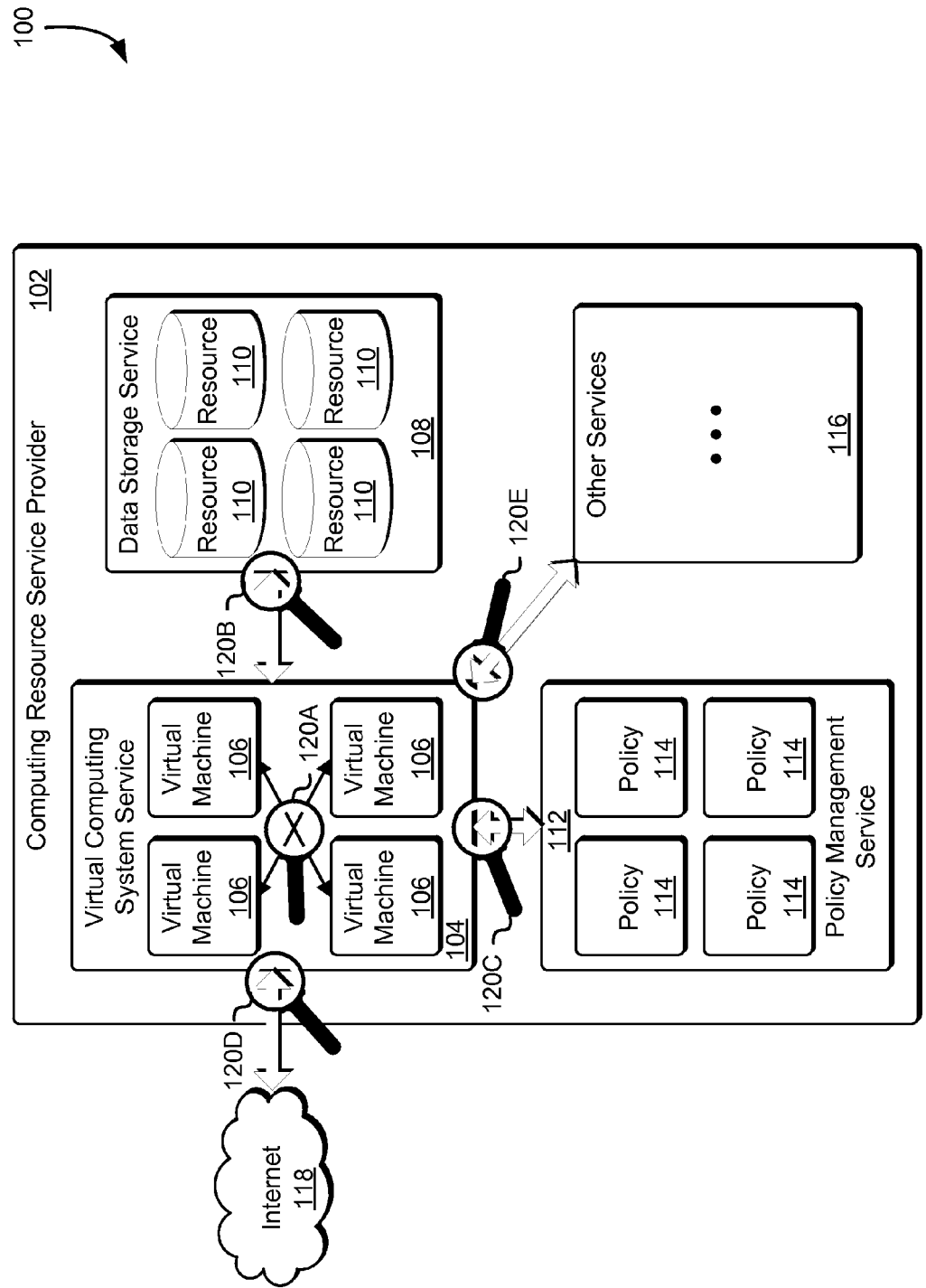
FIG. 1 illustrates an example of a computing resource service provider environment with introspection points in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include determining, by a computing resource service provider, a set of introspection points in a distributed computing system. The distributed computing system may include either or both physical and virtual computing systems. The distributed computing system may further include one or more computing network environments. The set of introspection points may be determined based on identifying characteristics that are accessible at the individual introspection points of the set of introspection points (e.g., network internet protocol addresses, encryption or decryption keys, software library versions, process names and identifiers, virtual machine identities, etc.). At the individual introspection points, the identifying characteristics may be measured, and a graph may be generated based on the measurements and/or configuration information of the distributed computing system. The generated graph may include a set of nodes representing elements (also referred to as resources or components) of the distributed computing system, with edges between the nodes indicating the relationships between the nodes.

One or more rules may be evaluated against the graph; for example, a rule may specify that credentials should have no greater privileges than necessary for accessing requested resources, and, from the graph data, it may be determined that credentials used to access a certain resource have greater privileges than actually used. In such a case, the system may perform a security action, such as notifying an appropriate entity (e.g., network security personnel, an appropriate customer of the computing resource service provider, etc.) of the rule violation or automatically modifying a security policy to constrain the privileges of the respective credentials to the minimum necessary. In some embodiments, a threat model may be generated from the graph to illustrate the potential vulnerabilities and/or rule violations in the distributed computing system.

The described and suggested techniques improve the field of computing in distributed systems, and specifically the field of threat detection and mitigation in distributed systems, by providing a new and useful system for detecting threats to a wide variety of resource types in large scale distributed computing systems. Additionally, the described and suggested techniques improve the functioning of computer systems by allowing automated updates in response to detected vulnerabilities and rule violations, thereby reducing the impact of a security breach of the system. Moreover, the described and suggested techniques offer meaningful advantages over general monitoring systems by providing the ability to customers of a computing resource service provider to monitor a wide variety of resource types in a computing network environment from locations in the computing network environment normally only accessible to the computing resource service provider itself.

FIG. 1 illustrates an aspect of an environment 100 in which an embodiment may be practiced. As illustrated in FIG. 1, the environment 100 may include a computing resource service provider 102 having providing services supported by a distributed computing system. Such services may include, among others, a virtual computer system service 104 hosting a set of virtual machines 106, a data storage service 108 hosting a set of data storage resources 110, a policy management service 112 for managing a set of policies 114, and one or more other services 116. Resources within the environment 100, such as virtual machines of the set of virtual machines 106, may be accessible by users and customers via the Internet 118 through an application programming interface provided by the computing resource service provider 102. FIG. 1 also illustrates a set of introspection points 120A-20E for collecting information about resource usage within the system.

In embodiments of the present disclosure, a distributed computing environment, where a variety of resource types, hardware and software, are provided by the computing resource service provider 102, allows collection of information at a variety of introspection points within the overall system. In some examples, an "application system" may refer to a set of machines that execute a software application. In some cases, the set of machines may be multiple computing systems, such as servers, in communication with each other and/or in communication with other resources. In a virtual computer system environment, the configuration of all of the virtual machine instances in the environment, including which virtual machines are in use, firewall rules for each of the virtual machines, and type, amount, and location of storage for each of the virtual machines may be stored as configuration information. This configuration information may be stored in a form accessible to the computing resource service provider 102 of the virtual computer system service 104, such as in tables/records from a data store. Configuration information could include such information as a list of virtual machine instances (e.g., the set of virtual machine 106) ascribed to a customer owner, a number and identity of processors of a virtual machine instance, open and closed firewall ports of a virtual machine instance, internet protocol addresses for the virtual machine, and software applications running on the virtual machine and which credentials are in use by which software application.

The computing resource service provider 102 may likewise detect and track each of the processes running in each virtual machine. In this manner, the computing resource service provider 102 may detect and flag when a previously undetected process launches within a virtual machine. Furthermore, the computing resource service provider 102 may also detect the software dependencies of processes installed in the virtual machine instance. Based on the data collected, the computing resource service provider 102 may create a threat model enumerating potential security threats within the monitored system. Analysis of the data may include walking each node/edge in the graph and determining, at each node, whether and what potential security risks exist (e.g., open firewall ports, unencrypted communications, unauthorized processes, out-of-date libraries, etc.), and determining whether the resource represented by each node is in compliance with rules specified by a customer and/or computing resource service provider.

From this threat model a customer, the computing resource service provider 102, or other authorized entity (e.g., network security personnel), may implement a security rule to mitigate risks revealed by the threat model. For example, based on list of software dependencies of processes running within the environment, a rule could be implemented to perform a security action if a process is detected to run using a version of a software library that is not the most recent version available. The rule may be driven by the risk that older software libraries may contain security vulnerabilities that were fixed in a newer library. In some examples, a "security action" may refer to an action performed by a computing system of the computing resource service provider to notify or mitigate a detected violation or threat to one or more elements in a computing environment under the control of the computing resource service provider. Such security actions could include any of a variety of actions, such as preventing the process from running, logging the event (e.g., date, time, location of the process, virtual machine instance hosting the process, version of the software library, etc.), automatically updating the library to the most recent version, or sending an alert to the customer or to network security personnel.

Other examples of security actions include updating one or more security policies (i.e., information defining permissions and constraints on users, applications, and other entities to access resources) corresponding to one or more entities (e.g., users, resources, applications, etc.) of the computing environment, sending notifications to a notification service of a computing resource service provider, and queuing a message in a message queue of a queue service. Still other examples of security actions include causing a change to a network (e.g., change to a secure protocol) to which at least one network interface is attached, or triggering a forensics action (e.g., capturing network traffic, memory, or other state of a virtual machine). Security actions could also include terminating a virtual machine instance, isolating a process or virtual machine from a network for later analysis, rotating or blocking one or more security credentials, rotating one or more cryptographic keys, revoking a user's or other entity's access to a resource, or installing a software update. Still other security actions could include capturing information (e.g., saving a snapshot) about the resource that potentially violates a rule, terminating and reinstantiating a virtual machine instance that appears to be behaving irregularly, storing a memory dump of a virtual machine instance, and/or reverting to a previous version of a data store.

A security action may also include updating the configuration of a computer resource to comply with one or more specified rules (e.g., close specific network ports, refuse communications from certain internet protocol address ranges, etc.). Such rules may be implemented in a variety of ways, for example, by modifying firewall rules (e.g., allowing/blocking certain ports, internet protocol addresses, or network protocols), by updating a configuration corresponding to a virtual computing network environment and/or the set of virtual machines 106 running under a virtual computer system service. Various types of security actions are described in the present disclosure, and any reference to security actions in the present disclosure is contemplated to include other types of security actions not expressly mentioned.

Likewise, the computing resource service provider 102 may track communications between processes and other entities internal or external to the local network of a virtual machine. Such tracked communications may allow a customer, the computing resource service provider 102, or other authorized entity to identify firewall vulnerabilities. For example, the computing resource service provider 102 may determine, based at least in part on the firewall configuration of a virtual machine, that a another computing system (virtual or physical) is allowed to communicate with the virtual machine. However, in this example, after a period of monitoring, no actual communication occurs between the first and second virtual machines. In this example, the computing resource service provider 102 may determine that, based at least in part on the lack of communication between the two virtual machine instances, that, even though permitted by the firewall, the communications channel between the first and second virtual machine instances should be closed. Based on this determination, the computing resource service provider 102 may perform a security action, such as automatically updating one or more firewall rules to block communication between the first and second virtual machine, or communicating the security concern to one or more customer owners of the virtual machine instances.

Similarly, the computing resource service provider 102 may track requests (e.g., for access, for data, etc.) by users, virtual machines, and other entities, and may track the corresponding credentials used with those requests. By performing an analysis on the tracked requests after a period, the computing resource service provider 102 may determine that the credentials allow greater privileges than the privileges actually used. For example, the credentials may be associated with read and write permissions to a database, but the credentials are actually only used for reading from the database; in such a case, the write permission may be, at best, unnecessary, and, at worst, a security risk. In response, the computing resource service provider 102 may perform a security action, such as alerting the customer owner of a tracked virtual machine account for which the credentials are being used of the potential excess privileges associated with the credentials, or may, if directed to take such automatic actions, automatically reduce the privileges associated with the credentials only to those actually used/required by the requesting entity.

Tracked information may further include which network connections are using an encrypted protocol versus an unencrypted protocol. Such information may be used to generate a threat model. For example, if the computing resource service provider 102 detects the virtual machine instance communicating with the other computing system under an unencrypted protocol, the computing resource service provider 102 may notify a customer owner of one of the virtual machine instance of the potential risk associated with the unsecured communication channel.

Furthermore, data tracked at different times may be compared, such as to identify changes in behavior, performance, and security risks. As an example, a software application may be updated to a new version and implemented within one or more virtual machine instances within the virtual computer system environment. Information as described in the present disclosure may be tracked for a period of time and subsequently compared against information previously tracked when the software application was at a previous version. Such comparisons may allow the computing resource service provider 102 and/or customer owner of the virtual machine instances to identify anomalies and security risks. For example, using the case described above of a virtual machine and another computing system that had initially been allowed to communicate with each other but had never done so, upon a software update, the computing resource service provider 102 may detect that the virtual machine is now communicating with the other computing system (or vice versa). In some situations, this communication may be desired behavior (e.g., they may have been intended to communicate with each other, but due to some configuration or software error, were unable to do so), and the tracked information may serve as confirmation that the software update had a desired effect. In other situations, this communication may be unexpected; such as in a case where a software update contains a security vulnerability that some entity may be trying to exploit to gain access to the second virtual machine. In either case, the computing resource service provider 102 may perform a security action which may include alerting the customer owner of the virtual machine instances and/or blocking communication between the first and second virtual machine instances until receiving express confirmation from the customer owner that such communication is permitted.

As illustrated in FIG. 1, the computing resource service provider 102 may designate a set of introspection points 120A-20E for tracking the described information. The set of introspection points 120A-20E may be data collection points specified by a customer, computing resource service provider, or other authorized entity. Information may be collected at the introspection points by one or more introspection agents. Types of introspection points may include points between a web service request and the target of the request, locations in a network between an application and the endpoint of the communication, error logs and other various logs, infrastructure configuration information for the computing environment, security controls (e.g., users, credentials, permissions, etc.) and policies for the computing environment, database permissions, and/or billing records. Examples of types of information that may be collected at the set of introspection points 120A-20E include, requestor identifiers (ID), a service ID, date/time, application programming interface methods called, source and destination internet protocol addresses, cryptographic keys, hostnames, system process IDs, and/or user IDs. Information collected at the introspection points may serve to identify what application programming interfaces are being used in the environment 100 and to what extent, which credentials or cryptographic keys are being used, information about network traffic flow, hostnames, domain names, running system processes, or user IDs.

For example, introspection point 120A illustrates an introspection point for collecting metadata about communications between one or more of the set of virtual machines 106. Similarly, introspection point 120B illustrates an introspection point for collecting metadata when a virtual machine of the set of virtual machines 106 attempts to access or receives data from one or more data storage resources of the set of data storage resources 110. For example, network communication monitored between a virtual machine and a data storage resource at the introspection point 120B may reveal whether the data passed between the virtual machine and the data storage resource is encrypted or not. Similarly, network communication monitored between the virtual machine and the data storage resource at the introspection point 120B may yield information about the identity of a logical storage container being accessed at the data storage resource, what credentials were used to access the data storage resource, etc.

Likewise, introspection point 120C illustrates an introspection point for collecting metadata about credential usage and associated permissions, as defined within the set of policies 114. Additionally, introspection point 120C illustrates an introspection point for collecting metadata about communication between one or more computing devices communicating with a virtual machine of the set of virtual machines 106 through the Internet 118. Lastly, introspection point 120E illustrates an introspection point for collecting metadata about utilization of one or more of the other services 116 as may be provided by the computing resource service provider 102 to a virtual machine of the set of virtual machines 106 of the virtual computer system service 104. Note that although the set of introspection points 120A-20E are illustrated as individual points, it is understood that each of the set of introspection points 120A-20E may themselves be a subset of introspection points.

In some examples, "introspection" may refer to an examination of states, system behavior, data, and information flows with and between processes in a distributed computing environment. In some examples, the term "introspection point" may refer to a data collection point, such as within a hypervisor, injection of executable code in application memory, or a software application with elevated access permissions (which may also be referred to as an "introspection agent") executing on a computing system within the environment 100. The introspection point (or "sensor")

may be an endpoint of a network connection or may also include reading from logs generated through use of application programming interfaces of the computing resource service provider. An introspection point for a customer of a computing resource service provider could also include billing records, or a system or service with access to billing records; for example, a customer may request to be notified if charges for certain types of usage exceed a particular rate or amount, if charges accrue in any region of the computing environment that has not generated charges before, or if any cumulative charges are measured to surge above a norm or expected range. Introspection points may allow gathering of metadata from which may be determined the activity that is occurring at that point. For example, if an application utilizes a public-key cryptography system (PKCS) interface, such as an interface that complies with PKCS#11 and/or other suitable standards, or some other interface for digitally signing data, the interface may be designated as an introspection point. In this example, whenever the interface is called to sign data, metadata about the signing could be collected. Likewise, an introspection point may be designated at any similar interface within the environment 100 of the computing resource service provider 102.

In some embodiments, a customer owner of one or more virtual machine instances can specify to the computing resource service provider 102, such as through a web interface, the set of introspection points 120A-20E (i.e., sensors) where an introspection agent is to take measurements (i.e., gather information). The customer owner may further specify a set of expected values or ranges for the measurements. Additionally, the customer owner may specify security actions for the introspection agent to take (or caused to be taken) if certain measurements fall outside expected values or ranges, and may specify for allowed/disallowed behavior by components of the customer owner's systems. For example, the customer owner may send a request to the computing resource service provider 102, such as through an application programming interface provided by the computing resource service provider 102, to implement a set of application agents responsible for monitoring software applications executing on the set of virtual machines 106 of the customer owner. In this example, the customer owner may provide, through the interface, the computing resource service provider 102 with a list of software applications the customer owner expects to be executing on the one or more virtual machines and may request to be notified if the computing resource service provider 102 detects any variance. In response to the request, in this example, the computing resource service provider 102 may configure the set of introspection agents to perform the security action of notifying the customer owner of any execution of a process not on the approved list in the set of virtual machines 106. In this manner, a customer owner may place (i.e., deploy), through the application programming interface, one or more sensors at specified locations in the customer owner's environment within the distributed computing system, if such sensors were not already deployed, without installing separate software applications and in locations within the distributed computing system that might otherwise be inaccessible to the customer owner.

In some cases, a sensor may be able to determine whether a communication to/from a software application is encrypted or decrypted, but, if encrypted, may be otherwise unable to determine any information about the data within the encrypted communication. In some embodiments, however, upon instruction and consent from a customer, sensors may be inserted within an virtualization layer that is managing the execution of one or more of the customer's virtual machine instances, and instructed to detect an encryption protocol (e.g., transport Layer Security, Secure Sockets Layer (SSL), etc.) handshake and obtain a key for decrypting the data in the transmitted communications (e.g., PreMasterSecret, etc.). In this manner, such a sensor may be enabled to monitor data within encrypted communications.

The set of virtual machines 106 may be one or more virtual machines configured to emulate computer system hardware. The set of virtual machines 106 may be implemented to run as a system virtual machine or as a process virtual machine (e.g., implemented to run under an operating system). In some implementations, the set of virtual machines 106 run under a virtualization layer. In some examples, a "virtualization layer" may refer to hardware or software that enables the physical hardware of the computing system to be used to provide computational resources upon which the set of virtual machines 106 may operate. The virtualization layer may be any device, software, or firmware used for providing a virtual computing platform for the set of virtual machines 106. The virtual computing platform may include various virtual computer components, such as one or more virtual processors, virtual memory and the like. The set of virtual machines 106 may be provided to customers of the computing service resource provider 102 and the customers may run an operating system or an application on virtual machines of the set of virtual machines 106. Further, the computing service resource provider 102 may use one or more of its own virtual machines for executing its applications. Examples of a virtualization layer include a hypervisor.

In other embodiments, data collected at the introspection points 120A-20E is used to determine a set of reference/baseline values or ranges. In some of these embodiments, the set of reference values or ranges may be determined by measuring (i.e., collecting) data at designated introspection points for a period of time in a test environment. Thereafter, variance from the determined set of reference values or ranges in a live (i.e., production) environment may cause the computing resource service provider 102 to respond with a security action, such as requiring confirmation from a customer owner that the variance is acceptable before allowing the actions causing the variance to continue. For example, if the computing resource service provider 102 identified a set of software applications executing within the test environment, the set of software applications may be recorded as expected to execute in a live environment. However, if the computing resource service provider 102 subsequently identifies a software application, not on the list, executing in the live environment (e.g., different application or different version of an application observed to execute in the test environment), the computing resource service provider 102 may respond with a security action, such as notifying the customer owner (e.g., through a user interface alert, text message, e-mail message, etc.) of the unexpectedly executing software application.

In some implementations, evaluation of the measurements taken at the introspection points 120A-20F and performance of security actions may occur in real-time. That is, as measurements are taken and threats to the computing environment are determined, security actions (e.g., notifying a customer, adding constraints to a configuration of the computing environment to ensure compliance with a set of rules, etc.) may be performed immediately. In other implementations, measurements may be logged for evaluation and threat determination later or upon request.

In an example, a set of virtual machine instances of a customer may be configured and expected to execute the same set of software, execute the same set of resources, and perform in a similar manner. Introspection points may be specified for the set of virtual machine instances; e.g., within virtual memory, monitoring network communications, calls to application programming interfaces, etc.). After tracking information at these introspection points for a period, the computing resource service provider 102 may determine that a subset of the set of virtual machine instances exhibit a variance from expected values (e.g., executing a different version of a software application, attempting to access an unexpected resource, application errors, slower than expected performance, etc.). Based on this determination, the computing resource service provider 102 may perform any of a variety of security actions, such as notifying the customer about the unexpected behavior from the subset of the set of virtual machine instances, performing diagnostics on the physical host of the subset, terminating and reinstantiating the virtual machine instances of the subset, etc.).

As noted, in some embodiments, an introspection point may be embodied by an introspection agent. The introspection agent may be implemented as a software application executing on the virtual or physical computing system with elevated access privileges (e.g., superuser/root access). The introspection agent may be implemented to execute within a virtualization layer (e.g., a hypervisor) or within a controlling domain of the virtualization layer. Additionally or alternatively, the introspection agent may be implemented in hardware, such as within a universal serial bus dongle device communicatively coupled to a physical system within the distributed computing system of the computing resource service provider 102. Alternatively or additionally, an introspection agent may be implemented within a kernel of an operating system of the physical or virtual computing system. The introspection agent may be configured to audit whenever a software process is launched, whenever a software process is stopped, and information about such software processes (e.g., file names, file locations, software dependencies, etc.). For example, the introspection agent may be configured to detect whenever a "process launched" event occurs, and, when such event occurs, gather a set of information about the software process (e.g., all libraries loaded by the process, checksum of the process, information on how the software process was compiled, parameters passed to the software process call, etc.).

In some embodiments, the introspection agent may be loaded into virtual memory of a virtual machine running under a virtualization layer (e.g., a hypervisor) and caused to execute. In other embodiments, the introspection agent may execute within the virtualization layer, and, based on a query of a virtual method table, determine and monitor a process space of the software processes in a specified virtual machine instance designated to be monitored. Additionally or alternatively, in embodiments the introspection agent may hook into a syscall handler of the virtualization layer for the virtual machine instance being monitored.

Within the computing resource service provider 102 environment, there may also be a data store containing a set of reference values representing expected values or expected ranges of values for the measurements being taken at designated introspection points. In response to variance from the expected value or range, the introspection agent may execute a security action, such as notifying a customer owner of a virtual machine instance that may be affected by the variance that the variance was observed. The introspection agent may access the data store containing the set of reference values and compare the set of reference values with information measured at the introspection points to determine whether variance from expected values or ranges has occurred.

Figure 6:
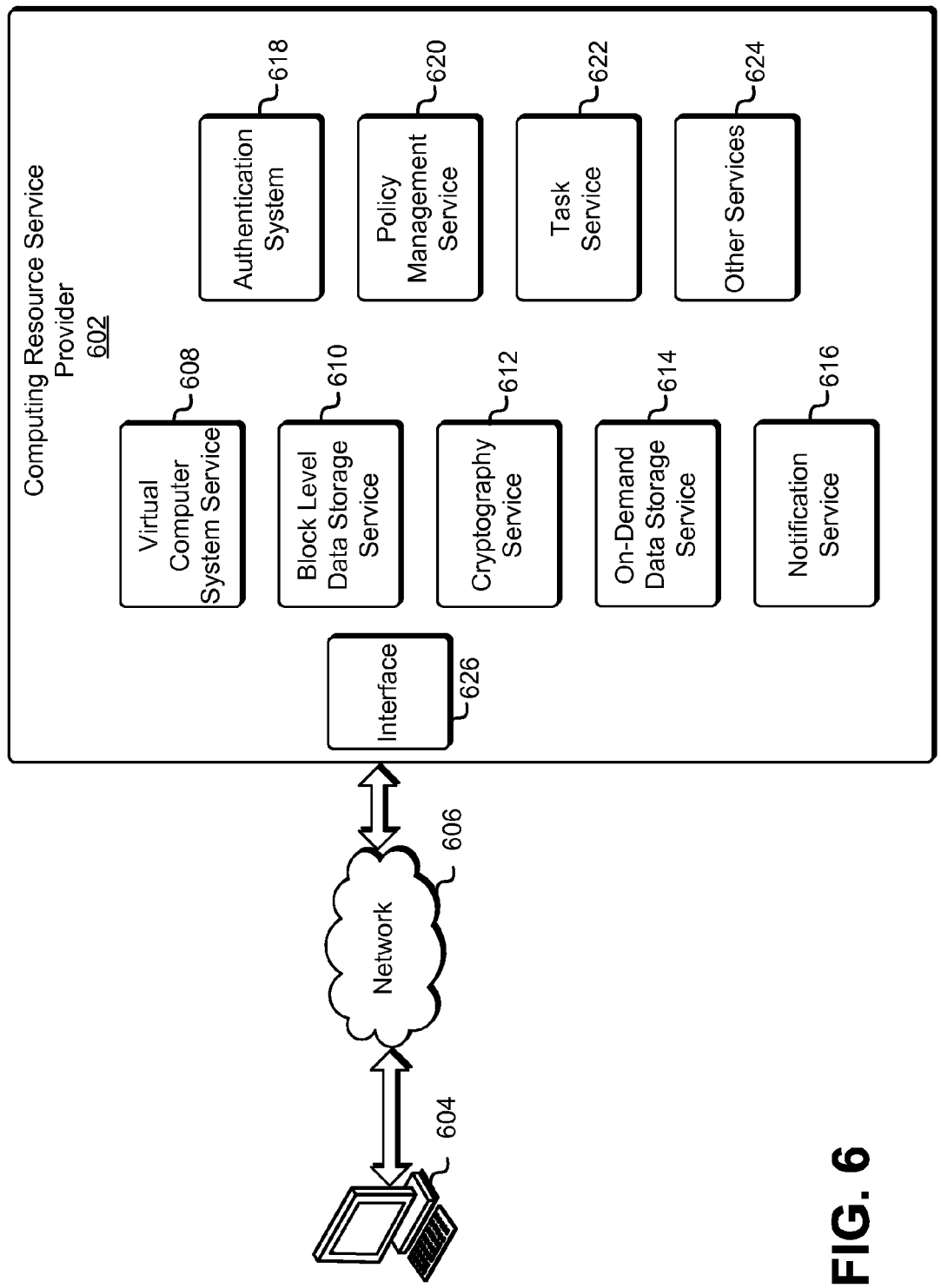
FIG. 6 illustrates an example of computing resource service provider in accordance with an embodiment.

The computing resource service provider 102 may be a computing resource service provider similar to the computing resource service provider 602 described in conjunction with FIG. 6, and may provide one or more computing resource services to its customers individually or as a combination of services of a distributed computer system. The one or more computing resource services of the computing resource service provider 102 may be accessible over a network and may include services such as virtual computer system services, block-level data storage services, cryptography services, on-demand data storage services, notification services, authentication services, policy management services, task services and/or other such services. Not all embodiments described include all of the services described and additional services may be provided in addition to, or as an alternative to, services explicitly described.

Customers of the computing resource service provider 102 may communicate with one or more of the services via an interface, which may be a web services interface or any other type of customer interface. Each service provided by the computing resource service provider 102 may have its own interface and subsets of the services may have corresponding individual interfaces in addition to, or as an alternative to, a common interface. A customer may communicate with the computing resource service provider 102 through a network, whereby the network may be a communication network, such as the Internet 118, an intranet, an internet service provider (ISP) network and/or some other such network as described below.

The virtual computer system service 104 may be used by the computing resource service provider 102 for providing computer system resources for customers. The virtual computer system service 104 may provide such computer system resources by instantiating virtual machine instances, such as the set of virtual machines 106, on physical hardware. The physical hardware may include physical hosts which may include any device or equipment configured to execute instructions for performing data computation, manipulation or storage tasks, such as a computer or server similar to the electronic client device 902 and the application server 908 described in conjunction with FIG. 9. The customer may interact with the virtual computer system service 104 to provision, place and operate virtual machine instances. The virtual machine instances may be used for various purposes, such as to operate as servers supporting a website, to operate business applications or, generally, to serve as compute power for the customer.

The data storage service 108 may provide a non-transitory persistent (non-volatile) storage for program and data files for use by computing systems, such as the set of virtual machines 106. Software applications executing within the set of virtual machines 106 may be stored within one or more data stores (also referred to as repositories) of the set of data storage resources 110. The data storage service 108 may additionally provide repositories for storing data used in accordance with the present disclosure.

The set of data storage resources 110 may be one or more storage resources, such as databases or storage resources as might be provided by services such as the block level data storage service 610 or the on-demand data storage service 614 of FIG. 6. The policy management service 112 may be a service configured to authenticate users of the customer and manage policies on behalf of customers of the computing resource service provider 102, such as the policy management service 620 of FIG. 6. The set of policies 114 may be security policies associated with roles and credentials of an entity (e.g., user, customer, application, resource, etc.) that specify the access privileges the entity may have to one or more resources. The one or more other services 116 may be any other service provided by the computing resource service provider, the resource usage of which may be tracked at an introspection point, such as the introspection point 120E.

In an example, for a physical host of one or more virtual machines under the control of the computing resource service provider 102, the virtual memory of a virtual machine may be designated as an introspection point. To collect data within the virtual memory, the computing resource service provider 102 may grant direct memory access (DMA) to an introspection agent executing on the physical host for inspecting contents of at least portions of the virtual memory. Subsequently, the inspected contents of the virtual memory may be compared against reference values or ranges in order to detect any deviance from expected memory contents. As another example, network communication channels may be designated as introspection points, and an introspection agent for analyzing data packets and performing net flow analysis may be integrated into networking hardware.

Figure 2:
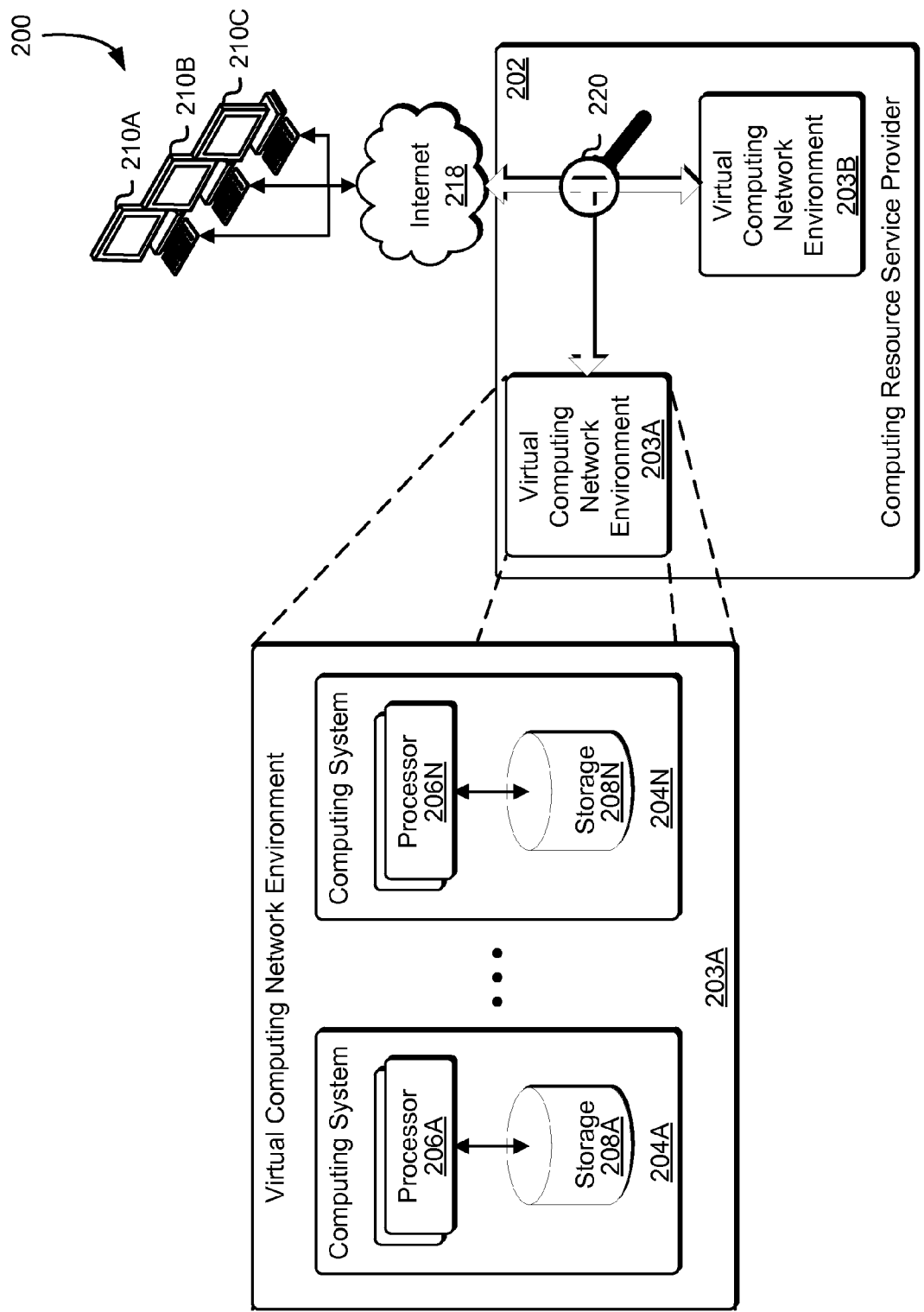
FIG. 2 illustrates an example of introspection of virtual computing network environments in accordance with an embodiment.

FIG. 2 illustrates an aspect of an environment 200 in which an embodiment may be practiced. As illustrated in FIG. 2, the environment 200 may include one or more virtual computing network environments 203A-02B in communication with one or more clients 210A-10C through a network connection, such as through the Internet 218, where each of the virtual computing network environments 203A-02B may be comprised of a set of computing systems 204A-04N, physical or virtual. Each of the set of computing systems 204A-04N, in turn, may include sets of various hardware and/or software components, such as a one or more processors 206A-06N and storage 208A-08N. In the environment 200, an introspection point 220 may be specified for collection of information associated with incoming and outgoing communications between the virtual computing network environments 203A-03B each other and between the virtual computing network environment and one or more clients 210A-10C via the Internet 218.

The one or more virtual computing network environments 203A-03B may be configurable pools of shared computing resources of a customer of a computing resource service provider, isolated from other virtual computing network environments. Isolation of the virtual computing network environments may be achieved through allocation of a private internet protocol subnet, a virtual local area network, and/or encrypted communication channels between the shared resources within the virtual computing network environments. A virtual computing network environment may include a set of virtual machine instances, such as set of computing systems 2004A-04N of the virtual computing network environment 203A.

The set of computing systems 204A-04N may be a set of virtual machine instances. Each of the set of computing systems 204A-04N may comprise resources from multiple services of the computing resource service provider 202. For example, the computing resource service provider 202 may, for the computing system 204A, utilize a virtual computer system service to instantiate a virtual machine, similar to the set of virtual machines 106 of the virtual computer system service 104 in FIG. 1, having one or more virtual processors 206A for the computing system 204A.

The sets of one or more virtual processors 206A-06N may be emulations of physical processors for a set of computing systems 204A-04N. Likewise, the storage 208A-08B may be configured to emulate persistent storage (e.g., hard drives, network drives, databases, etc.). The storage 208A may be, for example, on-demand storage, block-level storage, or a database provided by a data storage service, similar to the set of data storage resources 110 of the data storage service 108 in FIG. 1. Configuration information for each set of computing systems 204A-04N may be stored in a data store and accessible to the computing resource service provider 202.

Each computing system of the set of computing systems 204A-04N may also have network ports for receiving requests from and establishing connections with computing systems internal and external to the respective virtual computing network environment 203A-03B. On the storage 208A-08N of the set of computing systems 204A-04N may be stored software library files, various configuration files, and/or digital certificates. As noted, the computing resource service provider 202 may be a computing resource service provider similar to the computing resource service provider 602 described in conjunction with FIG. 6, and may provide one or more computing resource services to its customers individually or as a combination of services of a distributed computer system. The one or more clients 210A-10C may be users or other entities attempting to access resources within one or more of the virtual computing network environments 203A-03B or may be customers of the computing resource service provider 202 attempting to access their own resources within their own virtual computing network environment.

The introspection point 220 may be configured to monitor network communications between computing systems of virtual computing network environment 203A and virtual computing network environment 203B. Similarly, the introspection point may be configured to monitor network communications between the Internet 218 and virtual computing network environment 203A and/or virtual computing network environment 203B. Monitoring network traffic at the introspection point may include analyzing at least a portion of data packets passing through the network connection.

As noted, the introspection point 220 depicted in FIG. 2 may actually be a set of introspection points, implemented as hardware or software, assigned/deployed at various points of the network of the computing resource service provider 202. Note also that, besides the introspection point 220, there may be other active introspection points, such as introspection points within the virtual computing network environment and between the services providing the resources for the set of computing systems 204A-04N (as described in more detail in the description of FIG. 1).

Figure 3:
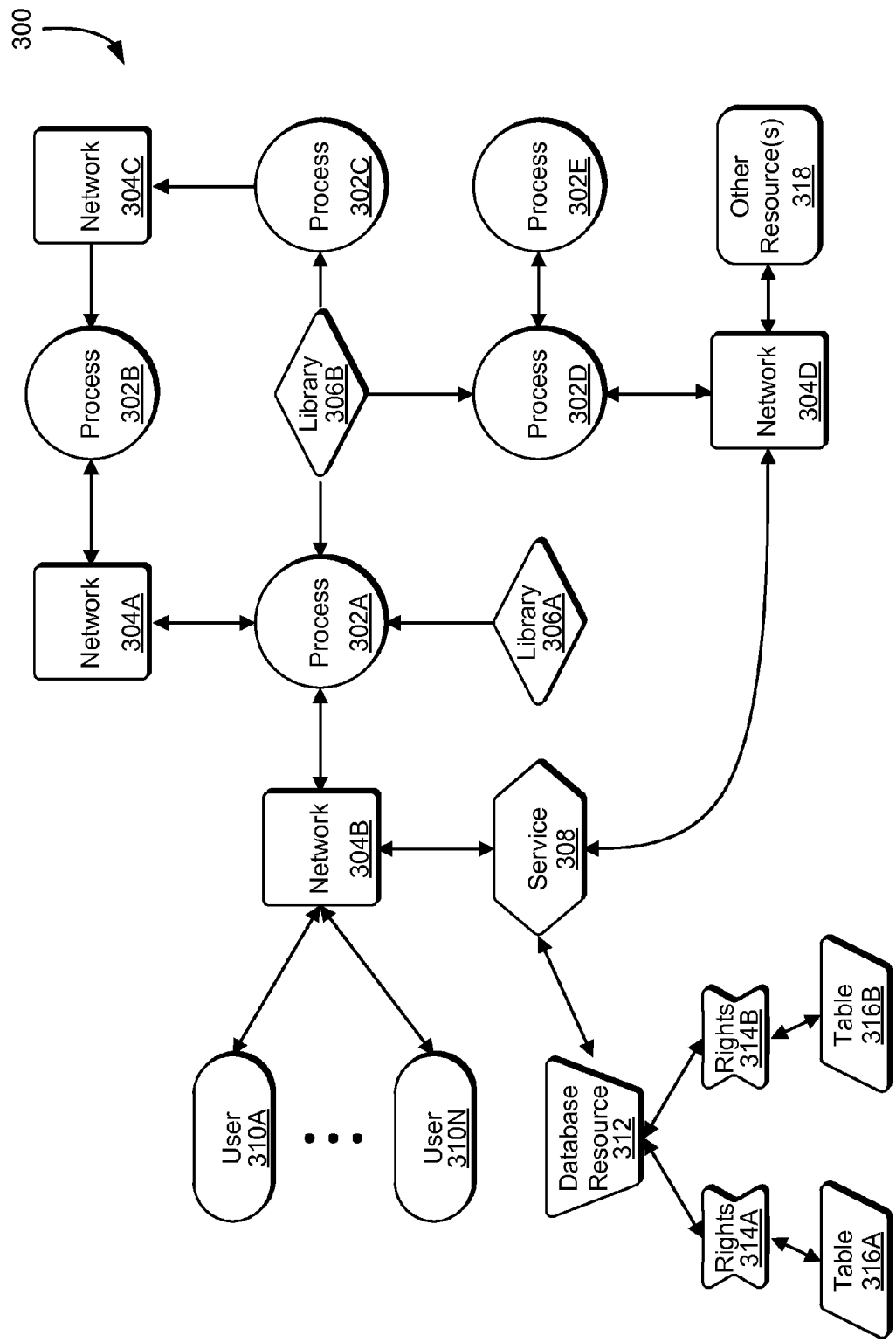
FIG. 3 illustrates an example of graph of resources in accordance with an embodiment.

FIG. 3 illustrates an example visualization 300 of a graph of an embodiment of the present disclosure. Specifically, FIG. 3 depicts a set of resources whose usage may be tracked at introspection points in the manner disclosed in the present disclosure. The set of resources may include any suitable resources that may be provided by a computing resource service provider, and, as an illustrative example, FIG. 3 shows a set of processes 302A-02E executing within a distributed computing system environment, a set of network connections 304A-04D, a set of software libraries 306A-B, and a service 308 of a set of services.

Thus, the tracked data, collected in the manner detailed in the descriptions of FIGS. 1 and 2, may be organized into a graph data structure. The graph may be generated as having nodes representing resources (e.g., software libraries, services of a computing resource service provider, network addresses and ports, processors of a virtual machine, software processes, etc.) and edges representing relationship (e.g., software library dependency, network connection, etc.) between those nodes. For example, information collected at introspection points may yield information linking processes to networks, processes to software libraries, networks to services, and other resources to other resources. A visual map (also referred to as a visualization) may further be generated from the graph. As an example, the visualization may be displayed using any suitable manner of displaying such a graph, such as through auto-generated JavaScript code provided to a web browser of a customer of the computing resource service provider.

Each of the set of processes 302A-02E represent a running process in a distributed computing system. Examples of such processes include database applications, web servers, e-mail hosts, and video streaming software. The set of network connections 304A-04D represent network connections linking processes of the set of processes 302A-02E to other resources, such as to another process or to a service provided by the computing resource service provider. The network connections may be any suitable network and protocol for communication between computing devices and/or processes executing on computing devices. Examples of a network includes the Internet, a local area network, a wide area network and Wi-Fi. Information collected at an introspection point regarding a network may include a network address, network port, and a type of protocol being used. The set of software libraries 306A-B may be files containing configuration data and/or pre-written executable code for use by one or more of the set of processes 302A-02E.

As noted, the service 308 may be a service provided by the computing resource service provider, such as a policy management service, a data storage service, or any of the services 608-24 described in conjunction with FIG. 6. Information about a service collected at an introspection point may include what operations are being performed by the service, whether communications are encrypted or unencrypted, and credentials being used for communication with the service. The service 308 may provide database services to a customer of the computing resource service provider. Thus, the database resource 312 may represent a particular database provided to the customer. The database may contain, tables, such as tables 316A-16B, for storing data records for the customer. The permissions 314A-14B (also referred to as rights) may represent access permissions a user or other identity has to the particular table. For example, permission 314A may be read/write access to the table 316A, whereas permission 314B may represent read-only access to the table 316B.

By identifying common characteristics from information collected at introspection points, relationships between nodes may be determined. For example, information collected at an introspection point on a computing system executing the process 302A may reveal that the process 302A receives data from an internet protocol address/port identified as network 304B. Additional information associated with the network 304B may include a process identifier of a process associated with the network 304B (e.g., the process 302A), an identity of a user agent communicating through the network (e.g., Internet Explorer, Chrome, etc.), and/or an identity of a software application being communicated with (e.g., Apache HTTP Server, etc.).

Such information may be stored in a database usable for introspection and other analysis. In embodiments of the present disclosure, the system may make conclusions about the relationships between the nodes. For example, information collected at an introspection point at service 308 would reveal that the service 308 communicates data through the network 304B. That is, by identifying that both the process 302A and the service 308 have the network 304B in common, the computing resource service provider can conclude that the process 302A is linked to the service 308 through the network 304B.

Likewise, it is shown in FIG. 3 that the process 302A communicates with process 302B through the network 304B. Additionally, it is shown that process 302C has attempted to communicate with the process 302B through network 304C, and also that the process 302B has not responded to the process 302C. It is also shown that process 302D also communicates with the service 308, but through network 304D. In an example, it may be that configurations for processes 302B and 302D indicate that they are meant to communicate with each other, but from the graph of FIG. 3, it may be observed that said processes do not communicate directly with each other. By drawing attention to such a mismatch between a configuration and the graph, the computing resource service provider may identify potential errors with configurations that prevent the intended operations of processes running within the distributed computing system. As another example, it may be that there is nothing in a security policy or firewall configuration preventing communication between the processes 302B and 302D, but only that during the observational period, they have not done so. Based on information, the computing resource service provider may determine that the processes 302B and 302D are not intended to communicate with each other and implement a firewall rule preventing communication between the two processes to ensure that, should the security of the virtual machine upon which either the process 302B or the process 302D is running be compromised, that the firewall rule would prevent one of the processes from accessing the other without authorization. Alternatively, if two processes, such as the process 302B and the process 302D, are established as a baseline never to communicate with each other, and, subsequently they are observed to communicate with each other, the computing resource service provider may respond with a security action, such as alerting a customer owner or network security personnel.

Once relationships between nodes are identified, rules may be implemented, such as by a customer owner through a user interface provided by the computing resource service provider, to specify acceptable behavior of the resources represented by the nodes. For example, a customer owner of a virtual machine upon which the process 302A is running may implement a rule specifying that communications between the process 302A and the service 308 must use an encrypted protocol. Based on this rule, the computing resource service provider may confirm that the network 304B does not use an unencrypted protocol. If the computing resource service provider detects that the protocol is unencrypted, the computing resource service provider may perform a security action, such as disallowing use of the network connection 304A to communicate with the service 308. Similarly, the customer owner may specify that all communications to/from the process 302A must be through an encrypted protocol, and the computing resource service provider may enforce this requirement on network 304A as well. Another example of a rule that may be implemented in the system of the present disclosure is a rule that specifies that, unless expressly allowed by the customer owner, no software applications within a set of virtual machine instances of the customer owner should execute with root/ superuser privileges. Still another example of a rule is to specify that network port 22 of the set of virtual machine instances should be closed/blocked. Another example of a rule is to specify that credentials cannot be used to access more than one type of service (e.g., file storage service versus database service, etc.). Similarly, a rule could specify that certain credentials have write access to one service but only read access with a different service.

Likewise, information collected at an introspection point at the process 302A may reveal that the process 302A has software dependencies of library 306A and 306B. Furthermore, information collected at introspection points at process 302C and process 302D reveal that they too depend on the library 306B. Based at least in part on this information, the computing resource service provider can quickly determine that, if a new version of the library 306B is made available, then the processes 302A, 302C, and 302D may be impacted or may need to be updated. Similarly, if the graph of the embodiment of the visualization represents a baseline (i.e., set of reference values or ranges), and/or if a subsequent generation of the graph reveals that the process 302A is using a different library than the library 306B, the computing resource service provider may respond by performing a security action. Such security action could include automatically updating the process 302C and the process 302D to use the different library (if it is determined to be a new, stable version of the library 306B), reverting the process 302A to use the library 306B instead of the different library, or sending an alert to the customer of the computing resource service provider responsible for virtual machine the process 302A is running on that the process 302A is using an unexpected library. The set of reference values or ranges as well as the appropriate security action to take could be specified by a customer owner of a virtual machine upon which the process is running. For example, the customer owner could specify that a specified library must be a specific version and for the computing resource service provider to halt/prevent any process with dependencies of a different library version from running.

Configuration information associated with the resources, and the generated graph, a threat model describing potential security issues, such as threats to confidentiality, availability, and integrity of data and the applications, may be generated for customers of the computing resource service provider regarding their virtual computer system environment. In some implementations, a customer of the computing resource service provider may specify rules to apply to the customer's virtual computing system environment, and the computing resource service provider may compare the specified rules to a current graph of the virtual computing system environment. The computing resource service provider may provide, such as through a user interface, the results of the comparison to the customer, such as "The present configuration complies with the specified rule," "The present configuration does not comply with the specified rule," "Unable to evaluate the present configuration against the specified rule," etc.

The users 310A-10N may be an individual, virtual or physical computing device, software process, or other entity authorized to access resources of a customer account. Each of the users 310A-10N may have a unique name/identity within the account, and may present or otherwise prove the possession of security credentials, such as with a password, access key, and/or digital signature, to gain access to computing resources. The users 310A-10N may represent one or more users that authenticate with the service 308 through the network 304B. The other resources 318 include any of a variety of other resource types, including, but not limited to, files, credentials, or security policies.

In some embodiments, resources of similar types may be combined into a single node. For example, in a distributed computing system there may be multiple identically-configured web servers. Rather than generating a graph with a node for each such web server, in these embodiments, the web servers may be represented by a single web server node. Consequently, data collected at introspection points at or between any of the web servers may be used to generate links from the web server node to other resources accessed by any of the web servers. Likewise, in another example, a distributed computing system may have clusters of web servers, application servers, and database servers. For the graph in this example, the web servers may be "merged" (i.e., grouped together) to be represented by a single web server node, the database servers may merged to be represented by a single database server node, and the application servers may be merged to be represented by a single application server node. Alternatively, all three types of servers may be merged/grouped into a single server node.

Thus, by analyzing data collected at the introspection points information may be gathered to determine if and which resources may be grouped/associated together. For example, the gathered information may detect that a child process was forked from a parent process at a first time and that a similar child process was forked from another instance of the parent process at a second time. Based on this information the two instances of the parent process may be merged into a node representing the unique parent process and the two child processes may be merged into a unique child process depending from the parent process, such as is illustrated by the process 302D (parent) and the process 302E (child). For example a web server parent process may spawn a PHP Hypertext Preprocessor (PHP) child process, and rather than have a dozen web server processes linked to a dozen PHP child processes in the graph, the parent processes and child processes may be separately merged to have a single web server parent process linked to a single PHP child process. Merges may be additive; for example, if one of the aforementioned web server parent processes also spawns a second child process, that the other web servers do not, that second child process may still be linked to the merged web server parent node. Such determinations may be made based on common information obtained at the introspection points for each of those processes. These techniques may be applied to link and merge a variety of resource types.

The logical grouping of resource types (i.e., the types of resources that may be merged) may be defined by the customer owner, such as through an application programming interface provided by the computing resource service provider. For example, customer owner may define five virtual machine instances belonging to the customer owner as "web servers" and may define seven other virtual machine instances and "application servers," and so on. In some implementations, default logical groupings of resources are specified by the computing resource service provider, and the customer can modify the default groupings as needed. In some implementations, such logical groupings are automatically be determined by the computing resource service provider based on data collected at introspection points. For example, by collecting data at each machine and examining what processes run on each machine, certain machines may be probabilistically classified in a first group and other machines may be probabilistically classified into a second group (e.g., at least a 50% chance of being in the first group or at least a 50% chance of being in the second group, inferred by similarities between machines/processes, etc.). Note that the type and quantities of the sets of resources depicted in FIG. 3 only, and the visualization of an actual implementation may include many thousands of nodes and many more resource types than shown in FIG. 3.

Figure 4:
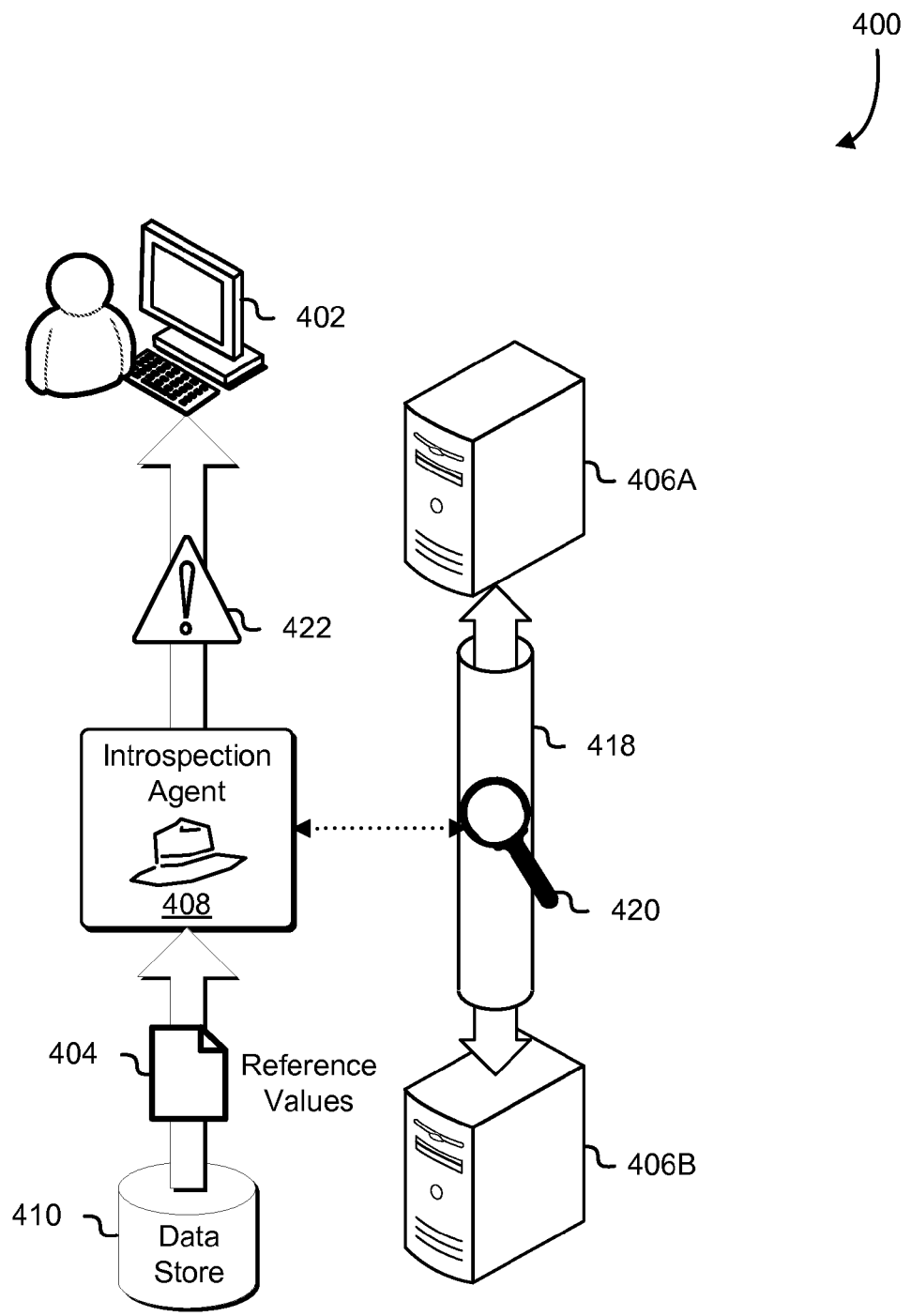
FIG. 4 illustrates an example of an introspection agent in accordance with an embodiment.

FIG. 4 illustrates an aspect of an environment 400 in which an embodiment may be practiced. Specifically, FIG. 4 depicts an introspection agent 408 collecting data at an introspection point 420 between a first computing resource 406A and a second computing resource, comparing the collected data against reference values 404 stored in a data store 410, and sending an alert 422 to a customer of a computing resource service provider if a variance between the collected data and the reference values 404 is found. Note that the embodiment depicted in FIG. 4 is one of many possible examples, and that the introspection agent 408 could be executing at various locations in the system, including on either of resources 406A-06B, a virtualization layer (e.g., hypervisor), a controlling domain of a virtualization layer, or a third resource not depicted.

The customer 402 may be a customer of the computing resource service provider that provides either or both of the resources 406A-06B for use by the customer 402. The reference values 404 may be one or more expected values or ranges for measurements at the introspection point 420. An example of reference values 404 may be a list of software applications running on resource 406A that have been approved to communicate with the resource 406B. The data store 410 may be any type of data storage configured to store the reference values 404 for the computing resource service provider.

The resources 406A-06B are intended to represent any of a variety of computing resources, such as virtual machine instances, physical computing systems, on-demand data storage resources, archival data storage resources, or security policies. Either or both 406A-06B may be provided by the computing resource service provider, or one of the resources 406A-06B may be a computing resource external to the computing resource service provider environment. For example, resource 406A may be a computing resource within the environment of the computing resource service provider, while resource 406B may be computing system external to the computing resource service provider but accessible to the resource 406A through the Internet or other network.

The communication channel 418 may be any type of communication channel by which two or more devices may communicate, including physical network cables, wireless communications, universal serial bus (USB), serial, parallel, and other conduits. The communication channel 418 may further be configured to communicate through, among others, the Internet, an intranet, wide area network (WAN), local area network (LAN), and direct connection. The communication channel 418 may further be configured to facilitate communications of any type of communication protocol, including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The introspection point 420 may be an introspection point similar to any of the introspection points 120A-20F described in conjunction with FIG. 1. In FIG. 4, the introspection point 420 is shown to be a data collection point for data flowing along the communication channel 418 between the resource 406A and the resource 406B.

The introspection agent 408 may be executable code injected and executing in application memory of one of resources 406A-06B, a software application with elevated access permissions executing a computing system with access to read the data at the introspection point 420, or may be implemented in hardware of the communication channel 418. Upon detection of a variance between measured values at the introspection point 420 and the reference values 404, the introspection agent 408 may cause the alert 422 to be sent to the customer 402. For example, the introspection agent 408 may determine from the data at the introspection point 420 that the communications channel 418 is not encrypted, and therefore may be vulnerable to infiltration by unauthorized entities.

The alert 422 may be an e-mail message, text message, message appearing in a popup window on a device of the customer, confirmation dialog, graphical indicator on a user interface provided by the computing resource service provider to the customer 402, or any other manner of notification to the customer 402 that a variance from expected values has been detected. The alert 422 provides notice that a potential violation has been detected, thereby allowing the customer 402 to determine whether the potential violation is an actual violation of a security rule and/or take action to mitigate the potential violation. For example, a customer of the computing resource service provider may specify a rule to take a security action to notify the customer if any month-to-date charges of the customer's virtual machine usage exceed an amount of two-hundred dollars. As another example, where a computing resource service provider provides virtual computer system services in different geographic regions and a customer employs services of the computing resource service provider in a first region but none in a second region, the customer may specify a security action to be notified if charges begin accruing to the customer from the second region. As still another example, if the system of an embodiment of the present disclosure determines, based on credential information collected at an introspection point of a customer computing environment, that a particular credential is being used insecurely, the alert 422 may provide notice to the customer that the particular credential may be in violation of a rule or may present a security vulnerability. In some implementations, the alert 422 may notify the customer 402 of actions to be taken by the computing resource service provider to mitigate the potential violation, such as changes to access permissions or firewall rules, and the customer 402 may be given the opportunity to confirm, deny, or undo the respective actions.

Figure 5:
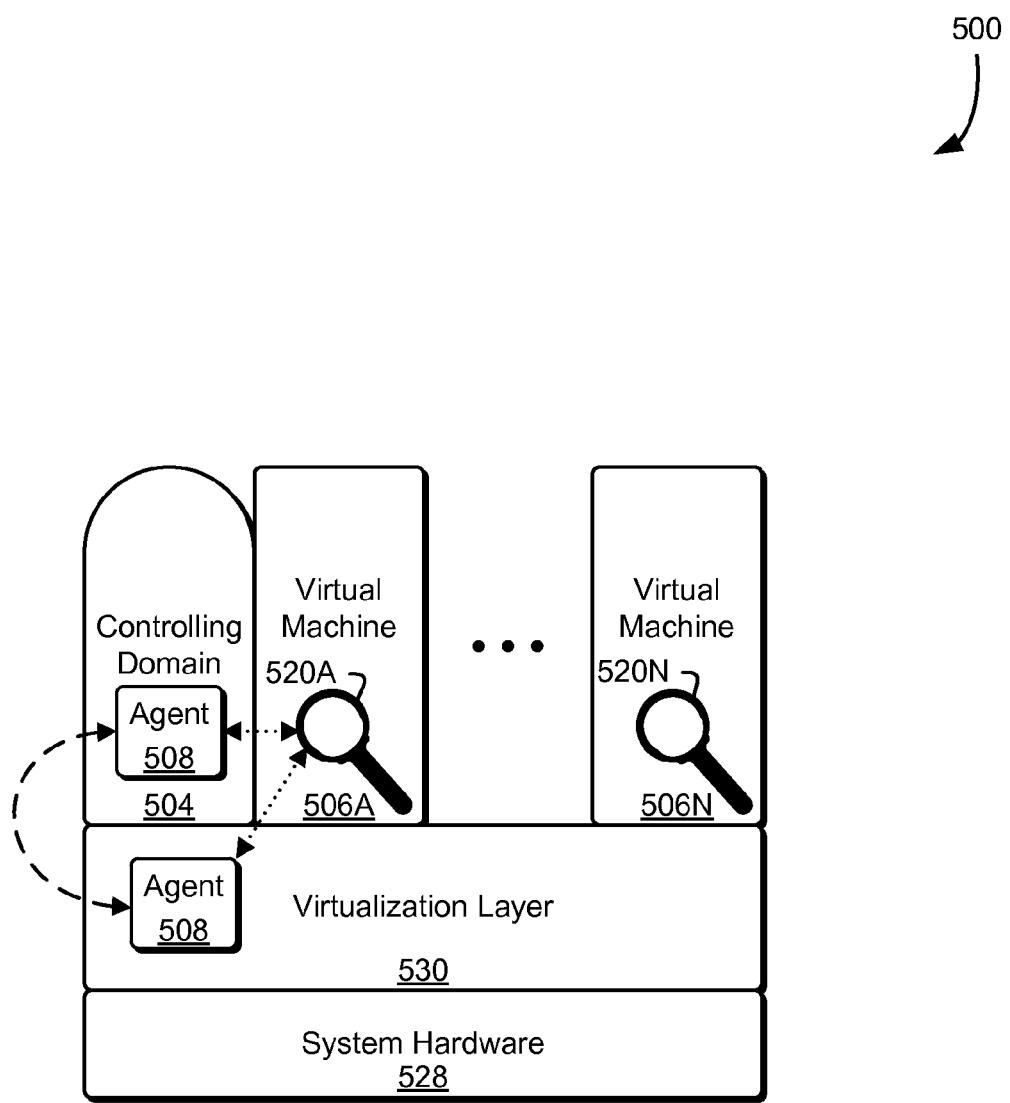
FIG. 5 illustrates an example of an introspection agent in a virtualization layer in accordance with an embodiment.

FIG. 5 illustrates an aspect of an environment 500 in which an embodiment may be practiced. Specifically, FIG. 5 illustrates how an introspection agent 508 may be configured to run within a virtualization layer 530 managing the execution of one or more virtual machines 506A-06N or may be configured to run in a controlling domain 504 of the virtualization layer 530. The introspection agent 508 may be executable code executing in the controlling domain 504 of a virtualization layer 530 or within the virtualization layer 430 itself. The introspection agent 508 may be configured to monitor one or more introspection points 520A-20N of the virtual machines 506A-06N. Upon detection of a variance between measured values at the one or more introspection points 520A-20N and reference values, the introspection agent 508 may cause a security action to be performed, such as sending an alert to a customer owner of the one or more virtual machines 506A-06N, isolating the virtual machine exhibiting a variance from the reference values from the network, or terminating the virtual machine exhibiting the variance.

The introspection points 520A-20N, as noted, may be a set of data collection points specified by a customer, computing resource service provider, or other authorized entity. Types of introspection points may include points at an incoming network port, log information regarding the virtual machines 506A-06N, and configuration files for the virtual machines 506A-06N. Collectable information at the introspection points 520A-20N may include credentials, whether communications are encrypted, security policies used, database permissions, and/or billing charges generated from usage of the virtual machines 506A-06N.

The controlling domain 504 may be a privileged virtual machine instance from which the one or more virtual machines 506A-06N of the virtualization layer 530 may be managed. Unlike the one or more virtual machines 506A-06N, the controlling domain 504 may have direct access to the system hardware 528 (e.g., network interface controllers, hard drives, memory, etc.). The virtualization layer 530 may enable the system hardware 528 to be used to provide computational resources upon which the one or more virtual machines 506A-06N may operate. The virtualization layer 530 may be any device, software or firmware used for providing a virtual computer platform for the one or more virtual machines 506A-06N. An example of virtualization layer is a hypervisor. The virtual computer platform may include various virtual computer components, such as one or more virtual processors, virtual memory, virtual devices and the like. The one or more virtual machines 506A-06N may be provided to customers of the computing resource service provider, and the customers may run operating systems, applications and/or other such computer system entities on the one or more virtual machines 506A-06N. Thus, the introspection agent 508 running in either the controlling domain 504 or virtualization layer 530 may allow the introspection agent 508 to collect information at the introspection points 520A-20N of the virtual machines 506A-06N. Note too, that, although not illustrated as such in FIG. 5, in some embodiments, the introspection agent 504 may additionally or alternatively execute in the system hardware 528, for example via an unified extensible firmware interface application or similar custom code on a peripheral hardware controller firmware of the system hardware 528.

The system hardware 528 may include the hardware of a physical (i.e., non-virtual) computing device configured to execute instructions for performing data computation, manipulation, or storage tasks. The system hardware 528 may include one or more processors, such as a central processing unit (CPU), a graphics processing unit (GPU) or a digital signal processor (DSP), memory, including static and dynamic memory, buses, and input and output ports that are compliant with any handshaking, communications or data transfer protocol. The system hardware 528 may also include storage devices, such as storage disks and tapes, and/or networking equipment. The virtualization layer 530 may enable the system hardware 528 to be used to provide computational resources upon which the one or more virtual machines 506A-06N may operate.

FIG. 6 shows an example of a customer connected to a computing resource service provider in accordance with at least one embodiment. The computing resource service provider 602 may provide a variety of services to the customer 604 and the customer 604 may communicate with the computing resource service provider 602 via an interface 626, which may be a web services interface or any other type of customer interface. While FIG. 6 shows one interface 626 for the services of the computing resource service provider 602, each service may have its own interface and, generally, subsets of the services may have corresponding interfaces in addition to or as an alternative to the interface 626. The customer 604 may be an organization that may utilize one or more of the services provided by the computing resource service provider 602 to maintain and deliver information to its employees, which may be located in various geographical locations. Additionally, the customer 604 may be an individual that utilizes the services of the computing resource service provider 602 to deliver content to a working group located remotely. As shown in FIG. 6, the customer 604 may communicate with the computing resource service provider 602 through a network 606, whereby the network 606 may be a communication network, such as the Internet, an intranet or an Internet service provider (ISP) network. Some communications from the customer 604 to the computing resource service provider 602 may cause the computing resource service provider 602 to operate in accordance with one or more embodiments described or a variation thereof.

The computing resource service provider 602 may provide various computing resource services to its customers. The services provided by the computing resource service provider 602, in this example, include a virtual computer system service 608, a block-level data storage service 610, a cryptography service 612, an on-demand data storage service 614, a notification service 616, an authentication system 618, a policy management service 620, a task service 622 and one or more other services 624. It is noted that not all embodiments described include the services 608-24 described with reference to FIG. 6 and additional services may be provided in addition to or as an alternative to services explicitly described. As described, each of the services 608-24 may include one or more web service interfaces that enable the customer 604 to submit appropriately-configured API calls to the various services through web service requests. In addition, each of the services may include one or more service interfaces that enable the services to access each other (e.g., to enable a virtual computer system of the virtual computer system service 608 to store data in or retrieve data from the on-demand data storage service 614 and/or to access one or more block-level data storage devices provided by the block level data storage service 610).

Figure 8:
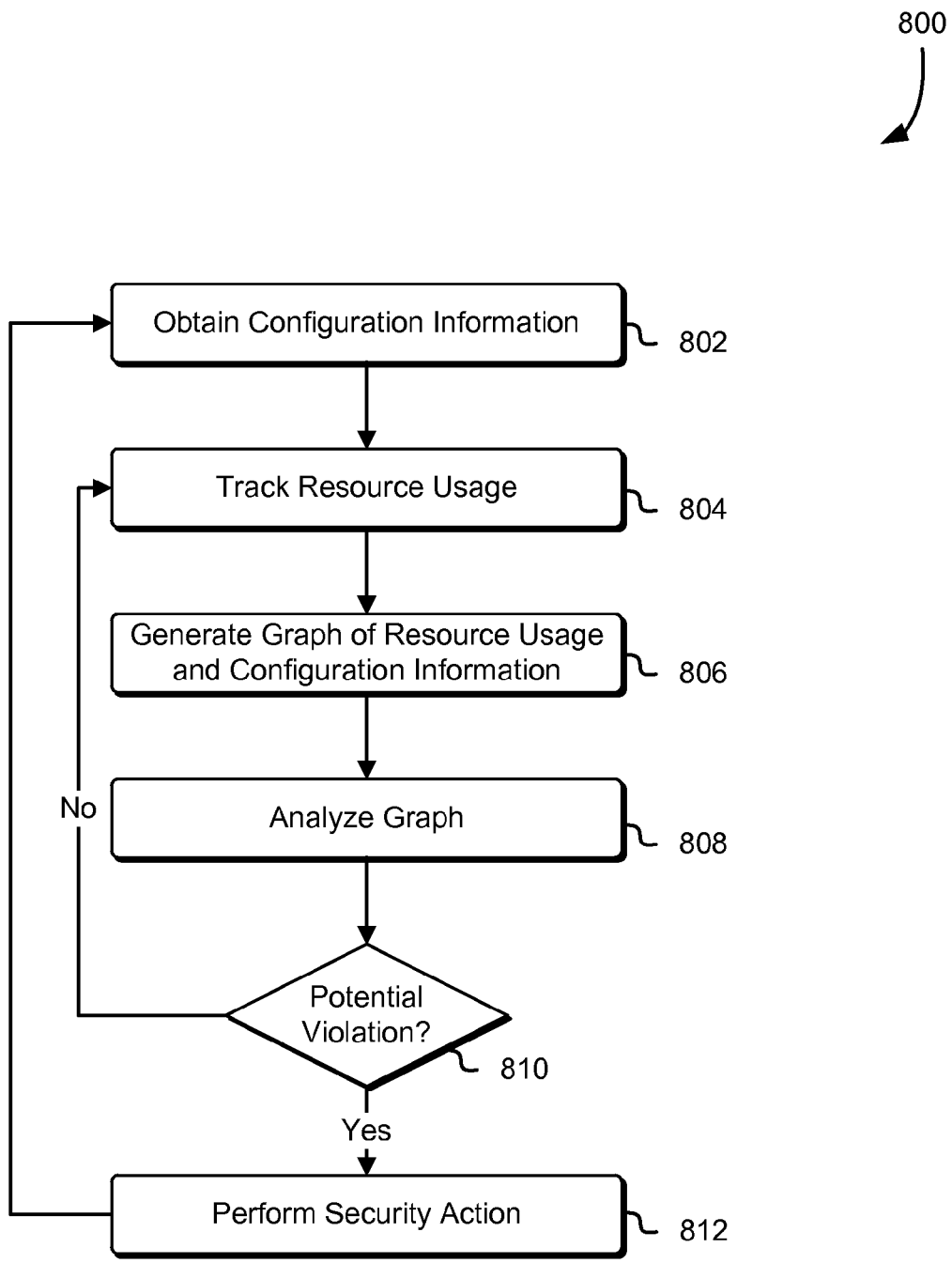
FIG. 8 is a flow chart that illustrates an example of determining potential vulnerabilities in a computing environment in accordance with an embodiment.

The virtual computer system service 608 may be a collection of computing resources configured to instantiate virtual machine instances on behalf of the customer 604. The customer 604 may interact with the virtual computer system service 608 (via appropriately configured and authenticated API calls) to provision and operate virtual computer systems that are instantiated on physical computing devices hosted and operated by the computing resource service provider 602. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 608 is shown in FIG. 8, any other computer system or computer system service may be utilized by the computing resource service provider 602, such as a computer system or computer system service that does not employ virtualization or instantiation and instead provisions computing resources on dedicated or shared computers/servers and/or other physical devices.

The block-level data storage service 610 may comprise one or more computing resources that collectively operate to store data for a customer 604 using block-level storage devices (and/or virtualizations thereof). The block-level storage devices of the block-level data storage service 610 may, for instance, be operationally attached to virtual computer systems provided by the virtual computer system service 608 to serve as logical units (e.g., virtual drives) for the computer systems. A block-level storage device may enable the persistent storage of data used/generated by a corresponding virtual computer system where the virtual computer system service 608 may only provide ephemeral data storage.

The computing resource service provider 602 also includes a cryptography service 612. The cryptography service 612 may utilize one or more storage services of the computing resource service provider 602 to store keys of the customers in encrypted form, whereby the keys may be usable to decrypt customer 604 keys accessible only to particular devices of the cryptography service 612.

The computing resource service provider 602 further includes an on-demand data storage service 614. The on-demand data storage service 614 may be a collection of computing resources configured to synchronously process requests to store and/or access data. The on-demand data storage service 614 may operate using computing resources (e.g., databases) that enable the on-demand data storage service 614 to locate and retrieve data quickly, to allow data to be provided in responses to requests for the data. For example, the on-demand data storage service 614 may maintain stored data in a manner such that, when a request for a data object is retrieved, the data object can be provided (or streaming of the data object can be initiated) in a response to the request. As noted, data stored in the on-demand data storage service 614 may be organized into data objects. The data objects may have arbitrary sizes except, perhaps, for certain constraints on size. Thus, the on-demand data storage service 614 may store numerous data objects of varying sizes. The on-demand data storage service 614 may operate as a key value store that associates data objects with identifiers of the data objects which may be used by the customer 604 to retrieve or perform other operations in connection with the data objects stored by the on-demand data storage service 614.

In the environment illustrated in FIG. 6, a notification service 616 is included. The notification service 616 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 616 may provide notifications to clients using a "push" mechanism without the need to periodically check or "poll" for new information and updates. The notification service 616 may further be used for various purposes such as monitoring applications executing in the virtual computer system service 608, workflow systems, time-sensitive information updates, mobile applications, and many others.

As illustrated in FIG. 6, the computing resource service provider 602, in various embodiments, includes an authentication system 618 and a policy management service 620. The authentication system 618, in an embodiment, is a computer system (i.e., collection of computing resources) configured to perform operations involved in authentication of users of the customer. For instance, one of the services 608-16 and 620-24 may provide information from a user to the authentication system 618 to receive information in return that indicates whether the user requests are authentic.

The policy management service 620, in an embodiment, is a computer system configured to manage policies on behalf of customers (such as customer 604) of the computing resource service provider 602. The policy management service 620 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 602, in various embodiments, is also equipped with a task service 622. The task service 622 is configured to receive a task package from the customer 604 and enable executing tasks as dictated by the task package. The task service 622 may be configured to use any resource of the computing resource service provider 602, such as one or more instantiated virtual machines or virtual hosts, for executing the task. The task service 623 may configure the one or more instantiated virtual machines or virtual hosts to operate using a selected operating system and/or a selected execution application in accordance with a requirement of the customer 604.

The computing resource service provider 602 additionally maintains one or more other services 624 based at least in part on the needs of its customers 604. For instance, the computing resource service provider 602 may maintain a database service for its customers 604. A database service may be a collection of computing resources that collectively operate to run one or more databases for one or more customers 604. The customer 604 may operate and manage a database from the database service by utilizing appropriately configured API calls. This, in turn, may allow a customer 604 to maintain and potentially scale the operations in the database. Other services include, but are not limited to, object-level archival data storage services, services that manage and/or monitor other services.

Figure 7:
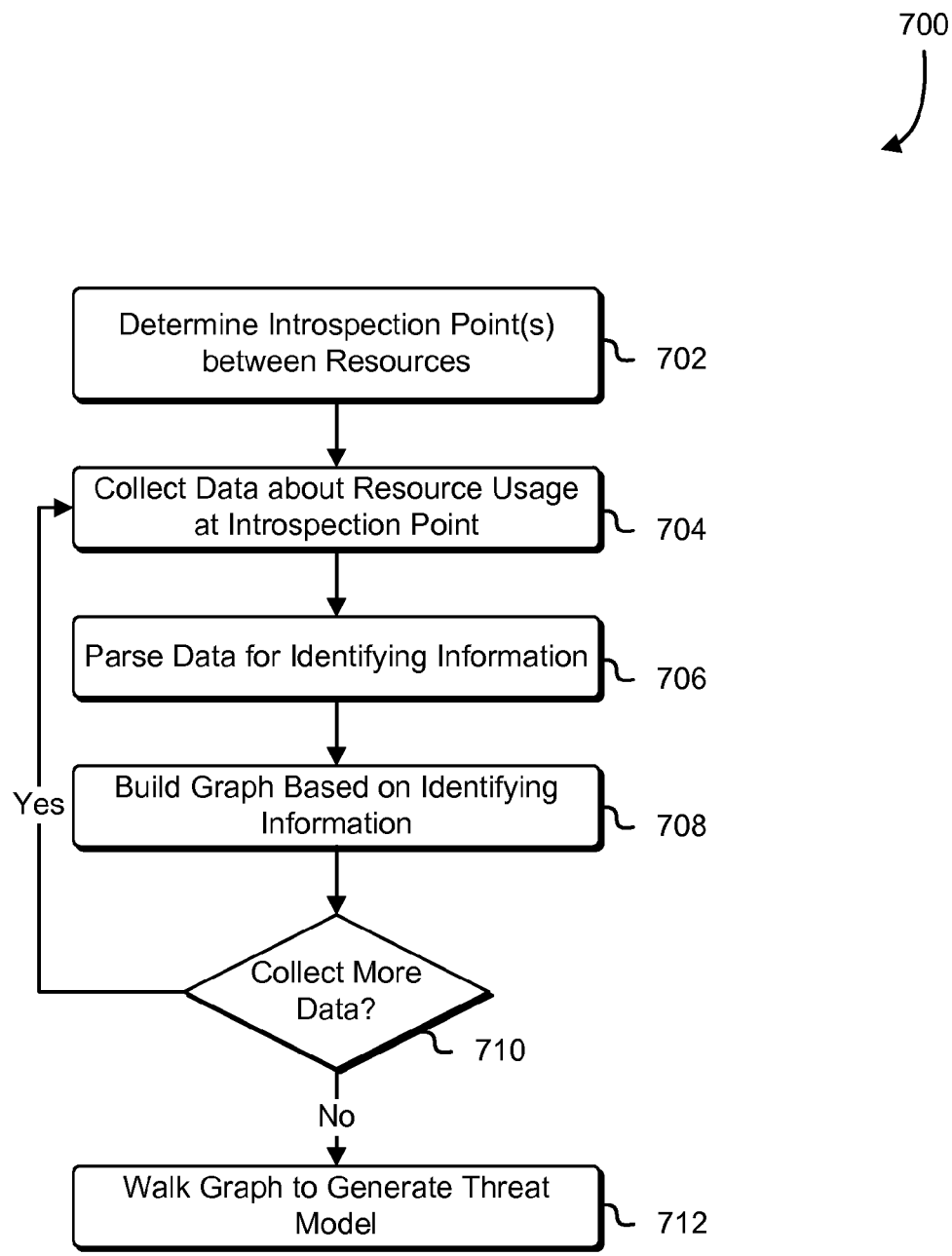
FIG. 7 is a flow chart that illustrates an example of generating a threat model from data collected at introspection points in accordance with an embodiment.

FIG. 7 is a flow chart illustrating an example of a process 700 for generating a graph based at least in part on data collected at introspection points in accordance with various embodiments. The process 700 may be performed by any suitable system such as a server in a data center, multiple computing devices in a distributed system of a computing resource service provider, or any electronic client device such as the electronic client device 902 described in conjunction with FIG. 9. The process 700 includes a series of operations wherein introspection points are determined, data is collected at the introspection points, and a graph is generated from the collected data.

In 702, an introspection point for obtaining measurements/collecting data about resources of a computing environment may be determined. For a given computing environment, there may be multiple resources with potentially several introspection points. Consequently, there may be multiple instances of the process 700 being performed in parallel by the system. The system performing the process 700 may initiate the operations of 702 in response to a request from a customer of a computing resource service provider. For example, the computing resource service provider may provide introspection of a set of the customer's virtual machine instances as a service. In other cases, the computing resource service provider may utilize introspection itself to analyze select sets of resources, select services, or the overall system. The identifying data collected may be used to identify threats to the computing environment and determine whether systems and resources within the computing environment are in compliance with rules and security policies. The introspection points may be determined based on identifying characteristics found in data that may be obtained at the introspection point. For example, an introspection point at a network connection may provide information regarding source and destination internet protocol addresses, process IDs, and whether or not communications are encrypted.

In 704, measurements are taken at (i.e., information collected from) the introspection point. The measurements/information may be obtained at the introspection points by an introspection agent implemented in software or hardware. In some embodiments, the introspection agent may be running as part of a virtualization layer. In other embodiments, the introspection agent may be implemented as a system-level software process running in the operating system of a customer virtual machine being measured. In still other embodiments, the introspection agent may be implemented in hardware, such as networking hardware that analyzes data packets passing between devices in the computing environment.

In 706, the measurements may be parsed to isolate and retrieve identifying information; that is, information from which the system may determine relationships between resources and characteristics of the computing environment usable for assessing security threats. As noted, such information may include identities of software processes, whether communications are encrypted, internet protocol addresses and ports, software dependencies, credentials, and access permissions.

In 708, a graph representing a set of objects (e.g., resources) in the computing environment may be generated. The objects may be linked by common characteristics determined from the identifying information determined in 706 and configuration information. As an example, a computing resource service provider may host three different virtual computing network environments, each virtual computing network environment including a set of virtual machine instances. Each virtual computing network environment and/or set of virtual machine instances may have configuration information stored in a data store defining various aspects of the virtual computing network environments and their virtual machine instances, such as information specifying the operating systems running under each virtual machine, the data storage resources usable by each virtual machine, firewall settings, and/or internet protocol addresses of the virtual machines within each virtual computing network environment. With reference to the configuration information and the measurements of 704, a graph of the relationships between the resources of each virtual network computing environment to each other and to the resources of the other virtual network computing environments may be generated.

In 710, the system performing the process 700 may determine whether additional data should be collected/measurements taken at the introspection points determined in 702. In some embodiments, measurements may be taken at intervals and compared with previous measurements. In cases where measurements taken at a first time and measurements taken at a second time do not differ from expected values (e.g., from a set of reference values), the system performing the process 700 may return to 704 to take additional measurements.

On the other hand, if the measurements taken at the first time and the measurements taken at the second time unexpectedly differ (e.g., a software library has changed, a software process a previously unused port is being used, etc.), the system performing the process 700 may proceed to 712 to generate a threat model. In some embodiments, expected values and/or expected ranges of measurements may be specified by the computing resource service provider or by a customer of the computing resource service provider. In other embodiments, the expected values and/or expected ranges of measurements may be determined, at least initially, from a baseline measurement of an exemplary virtual computing network environment. Such expected values and ranges may be modified by the customer and/or computing resource service provider as needed.

In 712, each node and edge in the graph may be walked to generate a threat model of the measured computing system. In some implementations, the threat model may be an interactive map/visualization of the computing system with various graphical indicators for drawing a user's attention to different potential threats and risk levels (e.g., "warning," "error," "secure," "unsecure," "unable to evaluate," etc.). The threat model may provide information identifying possible ways the computing environment could be attacked, number, and type of actual attacks detected, probability of harm, levels of risk, and suggestions on mitigating threats. Note too that after 712, the operations of 702-12 may be repeated as often as required by the customer or computing resource service provider. Note too that one or more of the operations performed in 702-12 may be performed in various orders and combinations, including in parallel.

FIG. 8 is a flow chart illustrating an example of a process 800 for generating a graph and performing a security action in accordance with various embodiments. The process 800 may be performed by any suitable system such as a server in a data center, multiple computing devices in a distributed system of a computing resource service provider, or any electronic client device such as the electronic client device 902 described in conjunction with FIG. 9. The process 800 includes a series of operations wherein configuration information for a set of resources is obtained, usage of the set of resources is tracked, a graph is generated, and based on an analysis of the graph, potential vulnerabilities (also referred to as risks) are identified and addressed.

In 802, configuration information for a set of resources (e.g., set of virtual machine instances, set of data storage resources in a distributed computing system, etc.) is obtained. Such configuration information may include firewall rules, identities of virtual machines running within the computing environment, access permissions for credentials used by users or virtual machines in the computing environment, and/or what databases are accessed by users and/or virtual machines in the computing environment. In some implementation, the configuration information may be stored in a data store or in various data files accessible to the computing resource service provider.

In 804, information relating to usage of the set of resources (i.e., information is collected at introspection points such as the introspection points set at 702 of FIG. 7) is tracked/logged. As described in the present disclosure, such information may be tracked and logged by an introspection agent executing within the computing environment. In 806, a graph, as described in the present disclosure, may be generated based on tracked resource usage information and the obtained configuration information.

In 808 and 810, the graph may be analyzed to assess the security state of the computing environment; i.e., to determine whether there are potential vulnerabilities within the computing environment. For example, if the system performing the process 800 determines that a first virtual machine has an open network communication channel to a second virtual machine, but in practice does not communicate with the second virtual machine, the system performing the process 800 may flag this as a potential violation. That is, should security of first virtual machine become compromised, the open communications channel may present a potential risk to the second virtual machine as well. Similarly, if a software application is detected as using an old version of a software library, this too may be flagged as a potential violation. In some implementations, analysis of the graph may include comparing the current generated graph to a previously generated graph to identify any differences, which may indicate potential vulnerabilities. Likewise, if measurements tracked by an introspection agent deviate from a set of reference values representing expected values or ranges of the measurements, such an anomaly may be flagged as a potential threat or violation. If no potential vulnerabilities are detected, the system performing the process 800 may return to 804 to continue to track resource usage.

However, if potential vulnerabilities are identified in 812, the system performing the process 800 may perform a security action. Security actions may include notifying a customer owner of a virtual machine instance being monitored, or may additionally or alternatively include making changes to configuration information to mitigate the potential vulnerabilities (e.g., implementing firewall rules to close vulnerable ports, etc.). In the event configuration information changes, either by the system performing the process 800 or by a customer, the system performing the process 812 may return to 802 to repeat the process 800 to determine whether the configuration change affects the potential violation or introduces new potential vulnerabilities. Note that one or more of the operations performed in 802-12 may be performed in various orders and combinations, including in parallel.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 9:
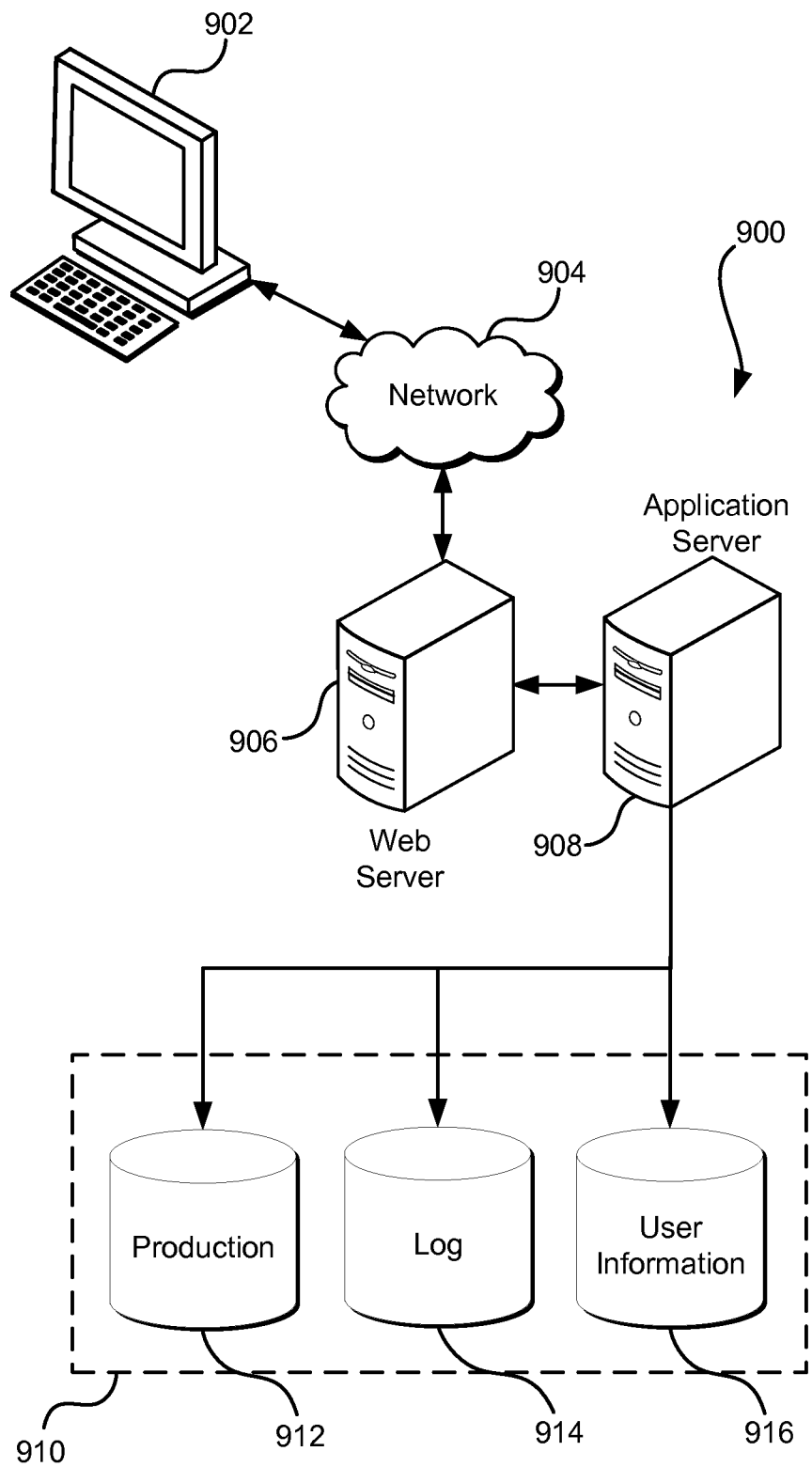
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 904 can be enabled by wired or wireless connections and combinations thereof. In this example, the network 904 includes the Internet, as the environment includes a web server 906 for receiving requests and serving content in response thereto, although for other networks an alternative device serving a similar purpose could be used as would be apparent to one of ordinary skill in the art.

The illustrative environment includes an application server 908 and a data store 910. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 908 can include any appropriate hardware, software and firmware for integrating with the data store 910 as needed to execute aspects of one or more applications for the electronic client device 902, handling some or all of the data access and business logic for an application. The application server 908 may provide access control services in cooperation with the data store 910 and is able to generate content including, text, graphics, audio, video and/or other content usable to be provided to the user, which may be served to the user by the web server 906 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 902 to provide the content in one or more forms including, forms that are perceptible to the user audibly, visually and/or through other senses including touch, taste, and/or smell. The handling of all requests and responses, as well as the delivery of content between the electronic client device 902 and the application server 908, can be handled by the web server 906 using PHP: Hypertext Preprocessor ("PHP"), Python, Ruby, Perl, Java, HTML, XML, or another appropriate server-side structured language in this example. It should be understood that the web server 906 and the application server 908 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store 910 may include mechanisms for storing production data 912 and user information 916, which can be used to serve content for the production side. The data store 910 also is shown to include a mechanism for storing log data 914, which can be used for reporting, analysis or other purposes. It should be understood that there can be many other aspects that may need to be stored in the data store 910, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 908. In one example, a user, through a device operated by the user, might submit a search request for a certain type of item. In this case, the data store 910 might access the user information 916 to verify the identity of the user and can access the catalog detail information to obtain information about items of that type. The information then can be returned to the user, such as in a results listing on a web page that the user is able to view via a browser on the electronic client device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 904 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 9. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
under the control of one or more computer systems that execute instructions,
determining a set of introspection points in a distributed computing system of a computing resource service provider, the set of introspection points having a first type of introspection point and a second type of introspection point determined based at least in part on a type of identifying characteristics accessible at individual introspection points of the set of introspection points;
measuring, at the individual introspection points, the identifying characteristics;
generating a graph representing a set of nodes based at least in part on the identifying characteristics measured, with individual nodes of the set of nodes corresponding to individual elements of the distributed computing system, and edges in the graph corresponding to measurements of the identifying characteristics correlating the individual elements to other individual elements; and
evaluating a rule based at least in part on the graph by at least:
determining that one or more measurements that correlate an individual element to another individual element in the graph are in noncompliance with the rule; and
performing a security action based at least in part on the noncompliance.

2. The computer-implemented method of claim 1, wherein each node of the set of nodes is of a type from a plurality of node types, the plurality of node types including one or more of a software library, a network connection, a software process, or a service provided by the computing resource service provider.

3. The computer-implemented method of claim 1, further comprising generating a threat model that identifies potential risks in the distributed computing system based at least in part on the graph.

4. A system, comprising:
one or more processors;
memory including instructions that, as a result of execution by the one or more processors, cause the system to:
receive a request to configure monitoring of a software application in a computing environment, the computing environment assigned to a customer of a computing resource service provider;
in response to receipt of the request:
select a set of sensors; and
configure the set of sensors to monitor information accessible at one or more locations in the computing environment;
generate a graph based at least in part on the information, the graph having nodes representing resources within the computing environment, the graph being generated by causing the system to at least:
identify a set of resource types within the computing environment;
identify a set of resources within the computing environment, wherein each resource within the set of resources corresponds to a resource type of the set of resource types; and
determine relationships between resources of the set of resources based at least in part on the information monitored; and
based at least in part on a comparison of the information monitored against a set of rules, determine whether to perform a security action.

5. The system of claim 4, wherein the instructions that cause the system to perform a security action include instructions that cause the system to alert the customer to a result of the comparison.

6. The system of claim 4, wherein the instructions that cause the system to select the set of sensors further includes instructions that cause the system to determine, for each sensor of the set of sensors, whether the sensor has been deployed in the computing environment, and, if not already deployed, deploy the sensor in the computing environment.

7. The system of claim 4, wherein the instructions that cause the system to perform a security action include instructions that cause the system to add one or more constraints to a configuration of the computing environment to enforce compliance of the computing environment with the set of rules.

8. The system of claim 7, wherein a constraint of the one or more constraints added to the configuration includes adding access constraints to a security policy associated with a set of credentials.

9. The system of claim 4, wherein the set of rules includes one or more of a software library being of at least of a particular version, a network communication protocol being encrypted, an unused network port being closed, or a set of credentials being assigned minimum privileges sufficient for accessing a requested resource.

10. The system of claim 4, wherein the comparison of the information monitored includes evaluating a set of rules against the graph.

11. One or more non-transitory computer-readable storage media having collectively stored thereon executable instructions that, as a result of execution by one or more processors of one or more computer systems, cause the one or more computer systems to at least collectively:
receive a request to monitor a computing environment;
based at least in part on receipt of the request:
determine a set of introspection points for monitoring the computing environment;
obtain a measurement at individual introspection points of the set of introspection points to obtain a set of measurements;
generate a graph of a set of resources in the computing environment, the graph correlating individual resources in the set of resources to other resources based at least in part on the set of measurements;
evaluate one or more security rules against the graph to determine one or more rule violations in the computing environment by causing the one or more computer systems to at least generate an assessment of a security state of the computing environment based at least in part on a comparison of the set of measurements against a set of reference values, the set of reference values being a set of expected values or ranges determined based at least in part on measurements obtained at the set of introspection points in a test computing environment; and
responsive to evaluation of the one or more security rules, perform a security action.

12. The one or more non-transitory computer-readable storage media of claim 11, wherein the executable instructions that cause the one or more computer systems to generate the graph further include instructions that cause the one or more computer systems to group an associated set of resource types into a single node.

13. The one or more non-transitory computer-readable storage media of claim 11, wherein at least a subset of the set of measurements are obtained by at least one introspection agent executing in a controlling domain of a virtualization layer in the computing environment.

14. The one or more non-transitory computer-readable storage media of claim 11, wherein at least a subset of the set of measurements are obtained by at least one introspection agent executing within a virtualization layer in the computing environment.

15. The one or more non-transitory computer-readable storage media of claim 11, wherein at least a subset of the set of measurements are obtained by at least one introspection agent executing within an operating system of a virtual machine being monitored in the computing environment.

16. The one or more non-transitory computer-readable storage media of claim 11, wherein at least a subset of the set of measurements are obtained by at least one introspection agent implemented in networking hardware of the computing environment.

17. The one or more non-transitory computer-readable storage media of claim 11, wherein the executable instructions that cause the one or more computer systems to determine whether to perform the security action include instructions that cause the one or more computer systems to determine whether an evaluation of the graph against a set of rules indicates that the computing environment is compliant with the set of rules.

18. The one or more non-transitory computer-readable storage media of claim 11, wherein the set of measurements is a first set of measurements, the graph is a first graph, and the executable instructions further include executable instructions that cause the one or more computer systems to:
    obtain a second set of measurements at a time after obtaining the first set of measurements;
    generate a second graph based at least in part on the second set of measurements; and
    determine whether to perform the security action based at least in part on a comparison between the first graph and the second graph.

19. The computer-implemented method of claim 1, wherein the measuring is performed by an introspection agent executing within one of:
    a hypervisor,
    a controlling domain of the hypervisor,
    network hardware of the distributed computing system, or
    an operating system of a virtual machine running in the distributed computing system.

20. The system of claim 4, wherein:
    the set of sensors obtain information at a first time and at a second time;
    the instructions that cause the system to generate a graph based at least in part on the information include instructions that cause the system to:
        generate a first graph based at least in part on the information obtained at the first time; and
        generate a second graph based at least in part on the information obtained at the second time; and
    the instructions that cause the system to determine whether to perform the security action include instructions that cause the system to determine whether to perform the security action based at least in part on a comparison between the first graph and the second graph.

21. The system of claim 4, wherein the instructions that cause the system to generate the graph further include instructions that cause the system to group, into a single node, a subset of the set of resources that correspond to a same resource type.

22. The one or more non-transitory computer-readable storage media of claim 11, wherein the executable instructions further include executable instructions that cause the one or more computer systems to generate a threat model that identifies potential risks to the one or more computer systems based at least in part on the graph.

23. The one or more non-transitory computer-readable storage media of claim 11, wherein the executable instructions that cause the one or more computer systems to perform a security action include executable instructions that cause the one or more computer systems to add one or more constraints to a configuration of the computing environment to enforce compliance of the computing environment with the one or more security rules.

* * * * *